United States Patent [19]
Knox et al.

[11] 3,807,851
[45] Apr. 30, 1974

[54] SLIDE IDENTIFICATION CLIP

[75] Inventors: George J. Knox, White Bear Lake; Lionel R. Schwartz, St. Paul, both of Minn.

[73] Assignee: Minnesota Mining and Manufacturing Company, St. Paul, Minn.

[22] Filed: June 6, 1972

[21] Appl. No.: 260,220

[52] U.S. Cl................. 353/120, 35/35 C, 40/28.1, 274/4 J
[51] Int. Cl. ... G03b 21/00, G09b 5/04, G09f 27/00
[58] Field of Search ................ 353/15, 19, 12, 120; 274/4 J; 35/35 C; 40/28.1, 152, 158; 179/100.2 A, 100.2 MD

[56] References Cited
UNITED STATES PATENTS
3,594,076 7/1971 Licitis et al. ......................... 353/120
3,087,259 4/1963 Orlick et al. ......................... 35/35 C

*Primary Examiner*—Louis R. Prince
*Assistant Examiner*—Steven L. Stephan
*Attorney, Agent, or Firm*—Alexander, Sell, Steldt & Delahunt

[57] ABSTRACT

A slide identification clip for attachment to a slide frame to provide the slide frame with a resiliently backed strip of magnetic tape for audio identification of a photographic transparency mounted in the slide frame. The clip has a unitary base with walls to extend along the bottom edge and one face of a slide frame. A strip of a resilient material is affixed to the wall of the base extending along the face of the slide frame and a strip of magnetic tape capable of resolving a 600 microinch signal is affixed to the strip of resilient material. The wall of the base extending along the bottom edge of the slide frame defines a reference surface with respect to any magnetic sound track on the magnetic tape.

6 Claims, 8 Drawing Figures

PATENTED APR 30 1974   3,807,851
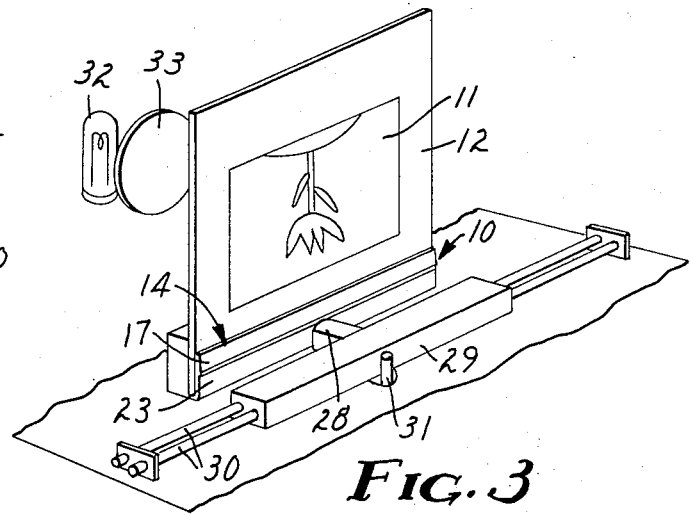

3,807,851

SLIDE IDENTIFICATION CLIP

FIELD OF THE INVENTION

The present invention relates to a slide identification clip for attachment to a slide frame to permit audio identification of a photographic transparency mounted in the slide frame.

BACKGROUND OF THE INVENTION

The prior art is replete with audio-visual machines wherein information about a 35mm transparency is recorded on a length of magnetic tape extending between a pair of reels or on a magnetic disk; the transparency and the recording media being supported by a common frame. Such machines have generally required a special frame in addition to or in place of the normal slide frame in which 35mm transparencies are mounted after processing. Such machines and frames have been too large, complex and expensive for home use by the individual consumer to provide audio identification of his personal photographic slides.

It has now been found that audio identification of a photographic transparency mounted in a slide frame may be provided in the two-inch space of a 35mm slide frame. U.S. application Ser. No. 260,184, filed concurrently herewith discloses a method and apparatus for audio identification of a photographic transparency mounted in a slide frame, the slide frame being provided on one face with a strip of magnetic tape capable of resolving a 600 microinch signal secured to and backed by a strip of a resilient material to form a composite slide identification strip. According thereto the slide frame is positioned for projection of the images on the transparency and a magnetic transducer having a gap width less than 200 microinches is moved against and in a straight line along the strip of magnetic tape on the positioned slide frame from one end thereof to the other at a uniform velocity less than 0.75 inch per second to record transparency identifying impulses on the magnetic tape. The slide identification clip of the present invention is intended for use in that apparatus.

SUMMARY OF THE INVENTION

The present invention provides a slide identification clip for attachment to a slide frame, comprising a unitary base having first and second walls each of which has a planar first surface at right angles to a planar first surface of the other wall, said walls having a length equal to that of one edge of the slide frame. The first wall of the base has a width across its planar first surface equal to that of the thickness of the slide frame and a planar second surface opposed to its planar first surface and the surface of the second wall opposed to its planar first surface comprises a tape support face having a tape support area within which the second wall has a uniform cross-sectional shape extending the length of the tape support face. A strip of a resilient material having a uniform surface is affixed to the tape support area of the tape support face and a strip of magnetic tape capable of resolving a 600 microinch signal overlays and is affixed to the strip of resilient material; the planar second surface of the first wall of the unitary base defining a reference surface with respect to any magnetic sound track on the magnetic tape. Means are included for securing the base to the slide frame with the magnetic tape exposed at one face of the slide frame in a plane parallel to the plane of the transparency.

THE DRAWING

In the drawing:

FIG. 1 is a front elevation view of a first embodiment of a slide identification clip constructed in accordance with the present invention and secured to a slide frame;

FIG. 2 is a cross-sectional view taken along line 2—2 of FIG. 1;

FIG. 3 is a perspective view of the slide clip and slide of FIG. 1 in use;

FIG. 4 is a partial rear perspective view of the slide identification clip of the first embodiment;

FIG. 5 is a cross-sectional view, similar to that of FIG. 2, of a second embodiment of the slide identification clip of the present invention;

FIG. 6 is a top view of a third embodiment of the slide identification clip of the present invention mounted on a slide frame;

FIG. 7 is a rear elevation view of the slide clip and frame illustrated in FIG. 6; and FIG. 8 is a cross-sectional view taken along line 8—8 of FIG. 7.

Referring now to FIGS. 1 through 4 of the drawing there is illustrated the first embodiment of the slide identification clip of the present invention. The illustrated clip 10 is constructed for identification of a 35mm transparency 11 mounted in a two-inch square cardboard frame and in FIGS. 1 through 3 it is illustrated in use attached to such a cardboard frame 12.

The slide identification clip 10 comprises a unitary base 14 formed with two walls 16 and 17 which have planar surfaces that meet at right angles to conform to the bottom edge and the front face of a slide frame 12, respectively, and the same length as that of the slide frame. The narrow wall 16 has two planar faces and a width across the surface thereof that contacts the bottom edge of the slide frame generally equal to the thickness of the slide frame 12. The surface of the wider wall 17 opposite its planar surface is designated the tape support face and it is formed with a tape support area 19 within which the wall 17 has a uniform cross-sectional shape extending the length of the tape support face.

A strip of resilient material 21 having a length equal to that of the base 14 and a uniform surface is affixed to the planar tape support area 19 and a strip of magnetic tape 23 of the same length and capable of resolving a 600 microinch signal is affixed to and overlays the strip of resilient material 21. The resilient material 21 forms a resilient backing for the strip of magnetic tape 23 to provide uniform tape-to-head contact when a magnetic head is pressed against and moved along the strip of magnetic tape. The magnetic tape 23 and the resilient material 21 form a composite identification strip having a smooth uniform magnetizable surface to assure that the magnetizable surface will be uniformly pressed against a magnetic head. As used herein, the magnetizable surface is "smooth" if its surface irregularities are less than the predetermined depth of penetration of the magnetic transducer into the tape resilient material composite. The required degree of smoothness and uniformity is achieved with the normal polyester film backed magnetic tapes and elastomeric foams having fine cell structures.

The tape-resilient material composite identification strip is chosen to be compressible between 0.001 inch and 0.010 inch by a 0.4 inch radius cylinder extending across a 0.15 inch width of the composite and forced against the tape with 250 grams force. When the composite strip is compressible more than 0.010 inch it is too soft to permit sufficiently accurate tracking of a magnetic transducer moved against and along the tape 23. When the composite is compressible less than 0.001 inch it is too firm to permit penetration by a magnetic transducer to allow for reasonable surface smoothness tolerances. The maximum desirable thickness of the composite identification strip is 0.060 inch.

In this first embodiment the tape support area 19 is planar and it is recessed behind the remainder of the tape support face of wall 17 a distance generally equal to the combined thickness of the resilient material 21 and the magnetic tape 23. The resilient material 21 and the magnetic tape 23 are thereby protected from removal and from wear to maintain the recording and reproducing properties attained by the combination.

A thin uniform layer of a pressure-sensitive adhesive 25 is coated on the planar surface of the wall 17 along the length thereof for securing the base 14 to the slide frame 12. A release liner 26, for example silicone coated paper, which adheres to and is readily releasable from the pressure-sensitive adhesive 25 is provided to cover the pressure-sensitive adhesive 25 prior to application of the slide identification clip 10 to a slide frame 12.

In one specific example of the slide identification clip 10 the base 14 was extruded acrylonitrilebutadienestyrene (ABS). Wall 16 was formed with a width of 0.05 inch and a thickness of 0.01 inch. Wall 17 was formed with a width of 0.30 inch and a thickness in the tape support area 19 of 0.01 inch, and the tape support area 19 was formed with a width of 0.17 inch and recessed a depth of 0.017 inch. The resilient material 21 was a 1/64-inch thick strip of Type Y-9331 Scotch-Mount, an elastomeric foam having pressure-sensitive adhesive on both faces, available from the 3M Company with offices at Saint Paul, Minnesota. The pressure-sensitive adhesive on one face of the resilient material 21 affixed it to the tape support area 19 on the base 14 and the pressure-sensitive adhesive coating on the opposed face affixed the magnetic tape 23 to the resilient material 21. The magnetic tape 23 was Type 277 Magnetic Cassette Tape from the 3M Company with offices at Saint Paul, Minnesota.

In use, the release liner 26 is peeled from the pressure-sensitive adhesive 25 and the clip is positioned and pressed against a slide frame 12 as shown in FIGS. 1 through 3 to secure the base 14 to the slide frame 12. The slide with the slide identification clip 10 attached may then be used in the apparatus of U.S. application Serial No. 260,184, filed concurrently herewith and schematically illustrated in FIG. 3. With the slide moved into position for projection of images on a transparency 11 by a lamp 32 and lens system, including a condensing lens element 33, the frame is held stationary and a magnetic transducer 28 is biased against the magnetic tape 23 with a force sufficient to compress the tape-resilient material composite at least 0.001 inch and not more than 0.007 inch and moved along the magnetic tape 23 at a uniform velocity less than 0.75 inch per second from one end thereof to the other to record or reproduce a transparency identifying message on the magnetic tape 23 in a single pass. The magnetic head 28 is secured to a trolley 29 which is slidable on support rods 30 and driven by a capstan 31 to provide the required controlled movement of the magnetic head 28. The bottom wall 16 of the slide identification clip 10 provides a reference surface for the magnetic tape 23 and when supported in the machine on a surface that is referenced with respect to the magnetic transducer 28, a precise relationship between the magnetic head 28 and the magnetic tape 23 is obtained. This assures that the azimuth and elevation relationships between the magnetic head 28 and any magnetic sound track on the magnetic tape 23 will be repeatable whenever the slide is removed from and replaced in position for projection and recording and/or reproduction. In this manner the bottom edge of the cardboard slide frame 12 is also protected against abrasion as it is slid into and out of the machine.

FIG. 5 illustrates a slide identification clip 35 constructed in accordance with the second embodiment of the present invention. As with the first embodiment it includes a unitary base 37 having a bottom wall 38 and a front wall 39 which have planar surfaces that meet at a right angle to conform to the bottom and front face of a slide frame 41; the bottom wall having two planar faces and the front face of the front wall defining a tape support surface. A strip of resilient material 42 is also affixed to the exposed tape support face of the front wall 39 and a strip of magnetic tape 43 is affixed to and overlays the resilient material 42. As in the first embodiment, the base 37, the resilient material 42, and the magnetic tape 43 are uniform along the entire length of the slide frame 41. In this embodiment, however, the base 37 is formed of a resilient material and the bottom wall 38 is extended in width along its entire length to project behind the slide frame 41 and the base 37 includes a rear wall 40 which extends from the longitudinal edge of the extended bottom wall 38 toward the front wall 39 to a position spaced therefrom less than the thickness of the slide frame 41 to capture the slide frame between the front wall 39 and the rear wall 40. This extending of the bottom wall 38 and addition of the rear wall 40 provide an alternative means for securing the slide identification clip to a slide frame. In one specific example the base 37 was mechanically formed from a strip of aluminum and the resilient material 42 and magnetic tape 43 were the same as those described with respect to the example of the first embodiment.

FIGS. 6 through 8 illustrate a slide identification clip 45 constructed in accordance with the third embodiment of the present invention. As in the first two embodiments, this clip 45 includes a base 46 having a bottom wall 47 and a front wall 48 which have planar surfaces that meet at a right angle; the bottom wall having two planar surfaces and the front face of the front wall 48 defining a tape support surface to which a strip of a resilient material 52 is affixed with a strip of magnetic tape 53 affixed to and overlaying the resilient material 52. As in the first two embodiments the bottom wall 47, the front wall 48, the resilient material 52 and the magnetic tape 53 extend uniformly the length of a slide frame 54. In this embodiment, however, the base 46 is formed of a ductile material, for example, aluminum or brass, and the ends of the front wall 48 are extended to form similar tabs 49 and 50 at the ends thereof which may be turned around the ends of the slide frame 54 as illustrated in FIGS. 6 through 8 to secure the slide identification clip 45 to the slide frame 54. Thus, the addition of the tabs 49 and 50 provides a third alternative means for securing the slide identification clip to the slide frame.

We claim:

1. A slide identification clip for attachment to a slide frame, comprising:

a unitary base having first and second walls each of which has a planar first surface at right angles to a planar first surface of the other wall, said walls having a length equal to that of one edge of a said slide frame, said first wall having a width across said planar first surface equal to the thickness of a said slide frame and a planar second surface opposed to said planar first surface, and the surface of said second wall opposed to its said planar first surface comprising a tape support face having a tape support area within which said second wall has a uniform cross-sectional shape extending the length of said tape support face, a strip of resilient material having a smooth uniform surface affixed to said tape support area of said tape support face, a strip of magnetic tape capable of resolving a 600 microinch inch signal affixed to said strip of resilient material to form a resilient composite identification strip having a smooth uniform magnetizable surface, said planar second surface of said first wall of said base defining a reference surface with respect to any magnetic sound track on said magnetic tape, and means for securing said base to a said slide frame with said magnetizable surface exposed at one face of the slide frame.

2. The slide identification clip of claim 1 wherein said tape support area is planar and is recessed below the level of the adjoining portions of said tape support face a distance generally equal to the combined thickness of said resilient material and said magnetic tape.

3. The slide identification clip of claim 1 wherein said means for securing said base to a said slide frame comprises a pressure-sensitive adhesive layer on said planar surface of said second wall opposed to said tape support face thereof.

4. The slide identification clip of claim 3 including a release liner covering said pressure-sensitive adhesive layer.

5. A slide identification clip for attachment to a slide frame, comprising:

a unitary base of a resilient material having first and second walls each of which has a planar first surface at right angles to a planar first surface of the other wall, said walls having a length equal to that of one edge of a said slide frame, said first wall having a width across said planar first surface equal to the thickness of a said slide frame and a planar second surface opposed to said planar first surface, and the surface of said second wall opposed to its said planar first surface comprising a tape support face having a tape support area within which said second wall has a uniform cross-sectional shape extending the length of said tape support face, a strip of resilient material having a smooth uniform surface affixed to said tape support area of said tape support face, a strip of magnetic tape capable of resolving a 600 microinch signal affixed to said strip of resilient material to form a resilient composite identification strip having a smooth uniform magnetizable surface, said planar second surface of said first wall of said base defining a reference surface with respect to any magnetic sound track on said magnetic tape, and means for securing said base to a said slide frame with said magnetizable surface exposed at one face of the slide frame, said means for securing comprising an extension of the width of said first wall of said unitary base to a distance greater than the thickness of a said slide frame and a third wall of said unitary base extending from the longitudinal edge of said extended first wall toward said second wall to permit capturing of a said slide frame between said second and third walls.

6. A slide identification clip for attachment to a slide frame, comprising:

a unitary base of a ductile material having first and second walls each of which has a planar first surface at right angles to a planar first surface of the other wall, said walls having a length equal to that of one edge of a said slide frame, said first wall having a width across said planar first surface equal to the thickness of a said slide frame and a planar second surface opposed to said planar first surface and the surface of said second wall opposed to its said planar first surface comprising a tape support face having a tape support area within which said second wall has a uniform cross-sectional shape extending the length of said tape support face, a strip of resilient material having a smooth uniform surface affixed to said tape support area of said tape support face, a strip of magnetic tape capable of resolving a 600 microinch signal affixed to said strip of resilient material to form a resilient composite identification strip having a smooth uniform magnetizable surface, said planar second surface of said first wall of said base defining a reference surface with respect to any magnetic sound track on said magnetic tape, and means for securing said base to a said slide frame with said magnetizable surface exposed at one face of the slide frame, said means for securing comprising a pair of tabs, one extending from each end of said second wall, said tabs being deformable to wrap around two opposed edges of a said slide frame to permit capturing of a said slide frame between said second wall and said tabs.

\* \* \* \* \*